March 9, 1965 N. B. TALSOE 3,173,023
INPUT AMPLIFIER FOR A DIGITAL COMMUNICATIONS SYSTEM
Filed July 10, 1961
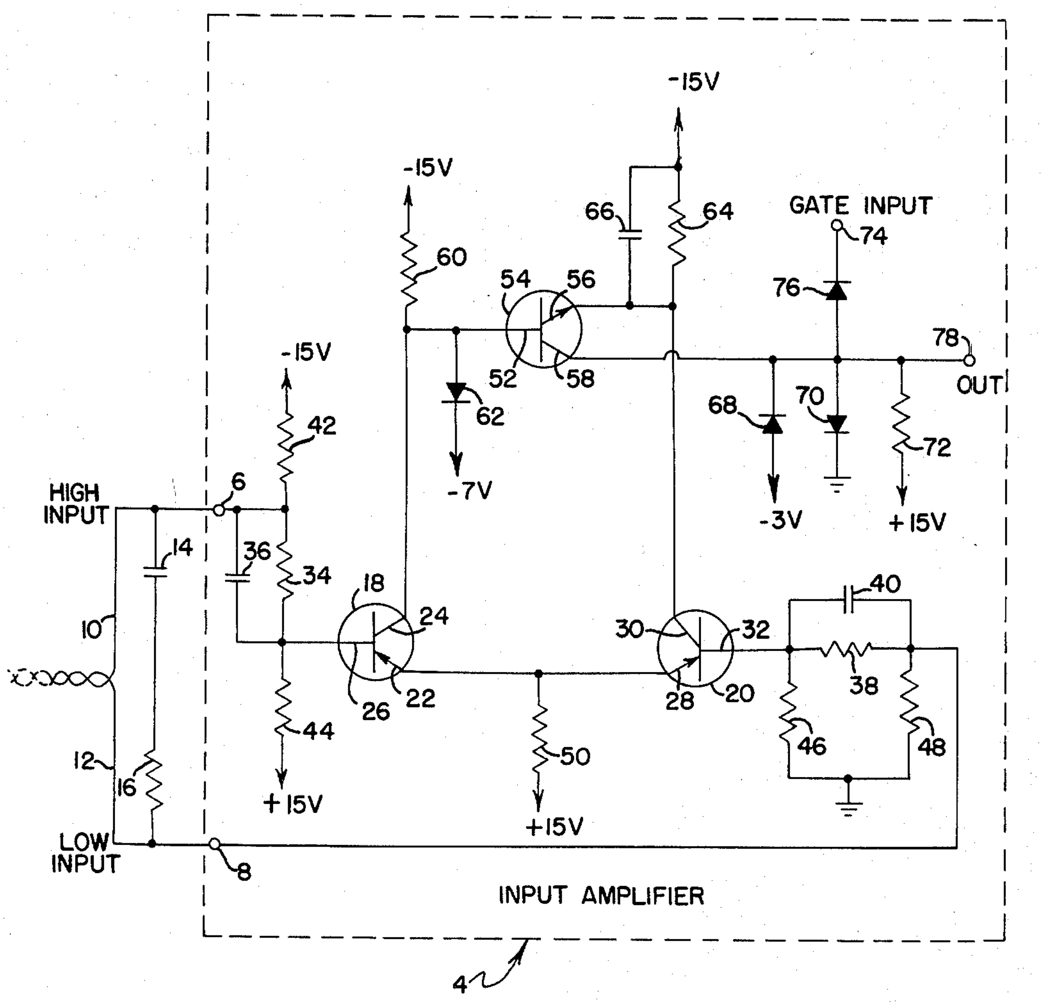
INVENTOR.
NORMAN B. TALSOE
BY
Stuart R. Peterson
ATTORNEY 3,173,023
Patented Mar. 9, 1965

3,173,023

INPUT AMPLIFIER FOR A DIGITAL COMMUNICATIONS SYSTEM

Norman B. Talsoe, St. Paul, Minn., assignor to Sperry Rand Corporation, New York, N.Y., a corporation of Delaware Filed July 10, 1961, Ser. No. 122,761
7 Claims. (Cl. 307—88.5)

This invention relates generally to logical switching circuits, and pertains more particularly to an input amplifier for use in a digital communications system in which the inputs consist of so-called "high" and "low" signals transmitted over twisted-pair lines.

Largely because of the expense of coaxial cables, pairs of twisted transmission lines are employed for the purpose of carrying the information between the output driver of a computer and the input amplifier of the external equipment associated therewith and vice versa. In practice various pairs of such lines are combined to form a cable. Primarily because of the fast rise and fall times of the signals carried by these lines and the proximity of one to the other, crosstalk and noise signals are induced in many of these lines.

Premised on the realization that the twisted lines of a given pair are so entwined that any crosstalk or noise signal induced in one line will be likewise induced in the other, the invention has for a general object the effective balancing out of these objectional signals. More specifically, an aim of the invention is to provide reliable operation at noise-to-signal ratios of approximately five to one without incurring the expense of more expensive coaxial cables.

A more specific object is to achieve the foregoing object without having to hold a tight tolerance on certain supply voltages, thereby providing a greater margin against component changes as well as voltage changes.

Another object of the invention is to transmit data at rates limited only by cable parameters. In this regard, data rates in the neighborhood of 750 kilocycles can be realized with ordinary or commonplace components.

A further object is to provide a means for transmitting signals with a relatively low power dissipation per bit, thereby permitting data to be transmitted over relatively long cables, say, on the order of several thousand feet if need be.

Other objects will be in part obvious and in part pointed out more in detail hereinafter.

The invention accordingly consists in the features of construction combination of elements and arrangement of parts which will be exemplified in the construction hereafter set forth and the scope of the application which will be indicated in the appended claims.

The single figure that has been illustrated is a schematic representation of an input amplifier exemplifying my invention in combination with the right-hand ends of a pair of twisted-wire transmission lines and an impedance matching circuit connected thereacross.

Referring now in detail to the drawing, the input amplifier there exemplifying the invention has been generally designated by the reference numeral 4 and is depicted as having a pair of input terminals 6, 8 to which are attached in actual use a pair of twisted-wire transmission lines 10, 12 extending from the output driver (not shown) of a digital communications system. For the sake of discussion, it will be assumed that the "high" line of the twisted pair will be attached to terminal 6, and the "low" line to terminal 8. Generally speaking, the "high" line is the signal-carrying line of the twisted pair, whereas the "low" line is the other wire of the pair.

Systems of the envisaged type are of a flexible nature, but it can be stated rather generally that one output driver situated at the computer can drive a length of transmission line up to several thousand feet long leading to a single input amplifier located with the external equipment, or several shorter lengths of transmission line may be employed terminating in a separate input amplifier. On the other hand, for short transmission lengths of several hundred feet or so up to ten output drivers may be connected in parallel to the same twisted pair at one end with but one input amplifier at the other end, or ten amplifiers may be connected in parallel to the same pair using one output driver. The point to be appreciated is that a twisted pair of transmission line of the type alluded to carries logical information between an output driver and an input amplifier plus the fact that the twisted lines are usually combined with a host of other twisted pairs to form a cable. Consequently, interfering noise and crosstalk signals are induced in many of the lines. The present invention deals with one such input amplifier that will find utility in the various arrangements that have been specifically mentioned as well as in other configurations.

Although not forming a pair of the input amplifier 4, it will be discerned that a capacitor 14 and resistor 16 are connected in series across the ends of the transmission lines which connect to the terminals 6, 8, and similar components are connected across the driver end of the cable for impedance matching purposes to absorb reflections where relatively long cable lengths are used.

Having presented the foregoing background explanation, the need for a reliable input amplifier can be better appreciated. Accordingly, the input amplifier 4 constructed in accordance with the teachings of the instant invention includes a pair of transistors, such as the P-N-P ones denoted by the reference numerals 18 and 20. The first transistor 18 has an emitter 22, a collector 24 and a base 26, and the second transistor 20 similarly has corresponding electrodes labeled 28, 30 and 32, respectively. The transistors 18, 20 form a non-saturating differential switch. In this regard, the "high" signal input arriving at the terminal 6 is fed to the base 26 of the first transistor 18 via an RC circuit comprising a resistor 34 and capacitor 36, while the "low" or other input arriving at the terminal 8 is fed to the base 32 via a second RC circuit comprising a resistor 38 and capacitor 40. The resistor 34 associated with the base 26 constitutes one segment of a voltage divider comprising additional resistors 42 and 44. Associated with the base 32 is a pair of resistors 46 and 48, these resistors being connected between either end of the resistor 38 and ground. The two transistors 18, 20 have a common emitter resistor 50.

The collector 24 of the transistor 18 is connected to the base 52 of a third transistor 54, in this case of N-P-N conductivity type, having an emitter 56 and a collector 58. The collector 24 of the transistor 18, it will be noted, is also connected to a collector resistor 60 and to a clamp diode 62.

The emitter 56 of the third transistor 54 is connected to an RC circuit including a resistor 64 and a capacitor 66. The collector 58 is connected to a pair of reversely poled clamp diodes 68 and 70, the latter being grounded. Also connected to the collector 58 is a collector resistor 72. An input gate terminal 74 is likewise connected to the collector 58 through a diode 76, the gating circuitry (not shown) normally attached to the gate input terminal 74 serving to provide the customary logical control of the output stage. Inasmuch as the collector 58 constitutes the output stage of the input amplifier circuit that has been herein described, an output terminal 78 is provided to which is attached the driven equipment.

Solely as illustrative and for the convenience of discussion during the operational sequence now to be given, various biasing potentials have been shown on the drawing. In this connection, it should be explained with reference to the signal input via the terminals 6 and 8, which is either a logical "0" or "1," that when the difference between the "high" input and the "low" input lines 10, 12 is more negative than −1.8 volts (indicating a logical "0" input) the transistor 18 is turned on and the transistor 20 is turned off. When the high input is less negative than −1.1 volts (signifying a logical "1" input), the transistor 18 will be turned off and in its stead the transistor 20 will be turned on.

Assuming now that the logical signal is such that the transistor 18 is conducting due to the negative bias applied to the base 26 by the voltage divider 44, 34, 42 which is connected between +15 volts and −15 volts is shown, the transistor 20 under these circumstances being non-conductive, should a negative going noise signal appear on the two input lines 10, 12 connected to the input terminals 6, 8 it follows that such a noise signal arriving at the "low" terminal 8 would tend to turn on the transistor 20. This is because the transistor 20 has also been shown as being of P-N-P conductivity with the consequence that a sufficiently large negative bias applied to its base 32 will render it conductive. However, the already conducting transistor 18 is driven harder by the same negative going noise signal. Since both the bases 26 and 32 have increased negatively by the same amount due to the noise signal, the now non-conducting transistor 20 is maintained in a non-conducting state with effectively the same reverse bias as before the noise pulse. Under conditions when transistor 18 is conducting, the connected collector 24 and base 52 will be at −7 volts as dictated by the clamp diode 62. For conditions of negative or positive noise pulses occurring at the base of each transistor 18, 20, the clamp current drawn by the diode 62 will increase or decrease, respectively, but will always be conducting. The maximum tolerable negative noise pulse permitted with the depicted circuit is −7 volts. For conditions where the transistor 20 is conducting and the transistor 18 is non-conducting, the base 26 of the now non-conductive transistor 18 is at approximately +1 volt and the emitter 22 thereof is at approximately +0.4 volt resulting in about a .6 volt reverse bias on the transistor 18. A similar condition exists for positive and negative noise pulses as described above. For a negative noise pulse the bases of both the transistors 18 and 20 will again increase negatively. However, in this instance the tied together collector 30 and emitter 56 will have their potential increased from approximately −10 volts to a limit of −7 volts where the transistor 20 saturates. This condition will occur for a maximum negative noise pulse of about −7 volts. Accordingly, a compensating action is introduced for both negative and positive going noise signals. Admittedly, it is possible that a negative going noise signal might be of sufficent magnitude to drive the first transistor 18 into saturation so that the back bias of the second transistor 20 will not compensate for the negative noise signal applied to the base 32. However, test results have shown that this is not apt to happen, particularly if cognizance of this possibility is taken into account when selecting component values.

The role played by the third transistor 54 will now be explained. What occurs is that when the transistor 18 is conducting there is emitter current flowing from the +15 volt supply to which the resistor 50 is connected through this resistor and the emitter 22. The current from the collector 24 flows through the resistor 60 to −15 volts as well as through the clamp diode 62 and into the base 52 of the third transistor 54. Due to the fact that the diode 62 is connected to −7 volts, the base 52 cannot go more positive than −7 volts.

While the base 52 of the third transistor 54, this being a N-P-N conductivity type as previously pointed out, is clamped to −7 volts, the base 52 is rendered more positive than when the first transistor 18 is nonconductive by reason of the voltage drop across the resistor 60 caused by the flow of collector current from the transistor 18 therethrough. At any rate, the transistor 54 is turned on owing to the more positive bias applied to its base 52.

With the third transistor 54 conducting, it can be seen that its collector current is determined pretty much by the value of the resistor 64. The collector current flows through the diode 68 and also through the resistor 72, these components being connected to −3 volts and +15 volts, respectively. Because of the clamping action of the diode 68, the output voltage at the terminal 78 is approximately −3 volts under these circumstances.

It will be recalled that when the difference between the "high" and "low" input lines 10, 12 is less negative than −1.1 volts, the second transistor 20 is to be turned on. This comes about because the negative bias impressed on the base 26 of the first transistor is under these conditions insufficiently negative to sustain conduction of the first transistor. Cessation of conduction of the transistor 18 removes the reverse-bias applied to the second transistor 20, and the base 32 is then sufficiently negative with respect to the emitter 28 to cause the second transistor 20 to conduct whenever the difference signal is less than −1.1 volts.

When the transistor 20 is on, though, the third transistor 54 becomes reverse-biased due to the fact that the current from the collector 30 of the transistor 20 is through the resistor 64 to −15 volts, thereby causing the emitter 56 of the transistor 54 to assume a potential of, say, approximately −10 volts due to the drop across the resistor 64. With the transistor 54 turned off, the output voltage at the terminal 78 is approximately +0.4 volt as determined by the clamp diode 70, which is oppositely poled from the diode 68, and the current flowing through the resistor 72 and this diode 70 to ground. As already stated, the diode 76 is connected to the gate input terminal 74 for providing a logical control of the output stage. The conventional signals applied to the terminal 74, it might be explained, may be in the form of a sequence or train of clock pulses. In any event it will be appreciated that the −3 volt signal at the output terminal 78 is indicative of a logical "0" and that the +0.4 volt signal is representative of a logical "1." Obviously, the supply and output voltages herein mentioned, as earlier pointed out, are only illustrative and are susceptible to considerable modification depending on various design factors. However, it will be appreciated that the input amplifier 4 forming the subject matter of this invention possesses considerable reliability from the standpoint of the degree of fidelity with which the amplified signal corresponds in rise-time, pulse-shape, and pulse timing to the input signal. The increased reliability is a direct result of providing more freedom from voltage and component tolerance changes.

As many changes could be made in the above construction and many apparently widely different embodiments of the invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A pulse amplifier comprising first, second and third transistors, each having an emitter, collector and base electrode, one of the electrodes of said first transistor being biased so as to cause current flow between the remaining two electrodes of said first transistor when a predetermined potential difference exists between a twisted pair of transmission lines and the corresponding one of the electrodes of said second transistor being biased to cause current flow between the remaining two electrodes of said second transistor when a second predetermined potential exists between said transmission lines, means connecting one of the electrodes of said third transistor to one of said remaining electrodes of said first transistor to cause conduction between the remaining two electrodes of said third transistor when current flows through said remaining electrodes of the first transistor, means in circuit with said remaining two electrodes of the third transistor for producing a first logical output signal when current flows through said remaining electrodes of the third transistor, means interconnecting the other of said remaining electrodes of the first transistor to the corresponding electrode of said remaining electrodes of the second transistor to prevent flow of current through said remaining electrodes of the second transistor when current is flowing through said remaining electrodes of the first transistor, means connecting the other of said remaining electrodes of the second transistor to one of the remaining electrodes of said remaining electrodes of the third transistor to prevent current flow through said remaining electrodes of the third transistor when there is current flow through the remaining electrodes of the second transistor, and means connected to the other of said remaining electrodes of the third transistor for producing a second logical output signal when no current is flowing through said remaining electrodes of the third transistor.

2. A pulse amplifier comprising first and second transistors of one conductivity type, a third transistor of opposite conductivity type, said transistors each having an emitter, collector and base, a first terminal for connection to the high signal line of a twisted pair of transmission lines, a second terminal for connection to the low signal line of said pair, means to apply operating potentials to the emitter, collector and base of said first transistor to cause conduction thereof when one predetermined difference in potential exists between said input terminals, means to apply operating potentials to the emitter, collector and base of said second transistor to cause conduction thereof when a second predetermined difference in potential exists between said input terminals, means responsive to the flow of emitter current of said first transistor for reverse-biasing said second transistor in accordance with the amount of said emitter current of said first transistor to assure nonconduction of said second transistor during conduction of said first transistor, means responsive to the collector current of said transistor for causing conduction of said third transistor during conduction of said first transistor to produce an output signal indicative of one logical number, and means responsive to the collector current of said second transistor for reverse-biasing said third transistor to assure nonconduction of said third transistor during conduction of said second transistor to produce an output signal indicative of a second logical number.

3. A pulse amplifier comprising first and second P-N-P transistors and a third N-P-N transistor, each having an emitter, collector and base, means for connecting the base of the first transistor to the high signal line of a twisted pair of transmission lines, means for connecting the base of the second transistor to the low signal line of said pair, means to apply operating potentials to the emitter, collector and base of said first transistor to cause conduction thereof when a difference in voltage exists between said lines which is more negative than a first given value, means to apply operating potentials to the emitter, collector and base of said second transistor to cause conduction thereof when a difference in voltage exists between said lines which is less negative than a second given value, a resistor common to the emitters of both said first and second transistors for reverse-biasing said second transistor in accordance with the amount of emitter current of said first transistor to assure nonconduction of said second transistor during conduction of said first transistor, means for applying operating potentials to the emitter, collector and base of said third transistor, circuit means connecting the collector of said first transistor to the base of said third transistor to cause conduction of said third transistor when said first transistor is conducting, means connected to the collector of the third transistor for producing a first logical output signal when current is flowing through the emitter and collector thereof, means connected to the collector of said second transistor and the emitter of said third transistor for reverse-biasing said third transistor when current is flowing through the emitter and collector of said second transistor, and further means connected to said collector of the third transistor for producing a second logical output signal when said third transistor is nonconductive.

4. A pulse amplifier in accordance with claim 3 in which the respective means for producing said logical output signals include a pair of reversely poled clamp diodes.

5. A pulse amplifier in accordance with claim 4 in which said circuit means connecting the collector of the first transistor to the base of said third transistor includes a clamp diode.

6. A pulse amplifier comprising a transistor having emitter, collector and base electrodes, means for applying a voltage signal to one of said electrodes to cause conduction of said transistor, clamp means connected to said first means and said one electrode for preventing said one electrode from going beyond a predetermined value to thereby limit the degree of conduction of said transistor, additional clamp means connected to a second of said electrodes for providing an output voltage signal having a first given value when said transistor is conducting, means for applying a voltage signal to the third of said electrodes to cause a reverse biasing of said transistor, and further clamp means connected to said second electrode for providing an output voltage signal having a second given value when said transistor is reverse biased.

7. A pulse amplifier comprising a transistor having emitter, collector and base electrodes, means normally applying biasing voltages to said electrodes to render said transistor non-conductive, means for applying a voltage signal to said base electrode to cause conduction of said transistor, clamp means connected to said base electrode for preventing said base from rising beyond a predetermined potential to thereby limit the degree of conduction of said transistor, additional clamp means connected to said collector electrode for providing an output voltage signal having a first given value when said transistor is conducting, means for applying a voltage signal to said emitter electrode to cause a reverse biasing of said transistor, and further clamp means connected to said collector electrode for providing an output voltage signal having a second given value when said transistor is reverse biased.

References Cited in the file of this patent

UNITED STATES PATENTS

| | | |
|---|---|---|
| 2,296,920 | Goodale | Sept. 29, 1942 |
| 2,985,836 | Hatton | May 23, 1961 |
| 2,997,600 | Hilberg | Aug. 22, 1961 |